United States Patent
Tian

(10) Patent No.: US 12,289,775 B2
(45) Date of Patent: Apr. 29, 2025

(54) INFORMATION DETERMINATION METHOD AND APPARATUS, AND TERMINAL DEVICE AND NETWORK DEVICE

(71) Applicant: GUANGDONG OPPO MOBILE TELECOMMUNICATIONS CORP., LTD., Guangdong (CN)

(72) Inventor: Wenqiang Tian, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 546 days.

(21) Appl. No.: 17/712,816

(22) Filed: Apr. 4, 2022

(65) Prior Publication Data
US 2022/0232645 A1 Jul. 21, 2022

Related U.S. Application Data

(63) Continuation of application No. PCT/CN2019/111058, filed on Oct. 14, 2019.

(51) Int. Cl.
*H04W 74/0833* (2024.01)
*H04W 72/0453* (2023.01)
(Continued)

(52) U.S. Cl.
CPC ... *H04W 74/0841* (2013.01); *H04W 72/0453* (2013.01); *H04W 74/006* (2013.01); *H04W 74/0866* (2013.01)

(58) Field of Classification Search
None
See application file for complete search history.

(56) References Cited

U.S. PATENT DOCUMENTS

2019/0306890 A1* 10/2019 Jang ............... H04L 5/0098

FOREIGN PATENT DOCUMENTS

| CN | 108289339 A | 7/2018 |
|---|---|---|
| CN | 108401297 A | 8/2018 |

(Continued)

OTHER PUBLICATIONS

3GPP TSG RAN WG1 Meeting #96 Athens, Greece, R1-1901610, Discussion on enhancement of initial access procedures for NR-U, ZTE, Sanechips, Feb. 25-Mar. 1, 2019. (12 pages).

(Continued)

*Primary Examiner* — Joseph E Avellino
*Assistant Examiner* — Charles E Eckholdt
(74) *Attorney, Agent, or Firm* — Young Basile Hanlon & MacFarlane, P.C.

(57) ABSTRACT

Provided are an information determination method and apparatus, and a terminal device and a network device. The method comprises: a terminal device sending a preamble on multiple random access resources; the terminal device determining first resource information associated with the multiple random access resources, and determining a random access-radio network temporary identifier (RA-RNTI) on the basis of the first resource information, wherein the RA-RNTI is used for descrambling a first PDCCH, and the first PDCCH is used for bearing control information of a random access response message corresponding to the preamble and/or the random access resources.

16 Claims, 9 Drawing Sheets

(51) Int. Cl.
*H04W 74/00* (2009.01)
*H04W 74/08* (2024.01)

(56) References Cited

FOREIGN PATENT DOCUMENTS

| CN | 109803445 A | 5/2019 | |
|---|---|---|---|
| EP | 2869654 A1 | 5/2015 | |
| EP | 2869655 A1 | 5/2015 | |
| WO | WO-2018161800 A1 * | 9/2018 | ........... H04B 1/7143 |
| WO | WO-2019031671 A1 * | 2/2019 | ........... H04W 48/12 |

OTHER PUBLICATIONS

International Search Report with English Translation for PCT Application PCT/CN2019/111058 mailed Jul. 3, 2020. (6 pages).
3GPP TSG RAN WG1 #96is; Xi'an, China Apr. 8-12, 2019; R1-1904414.
EP Extended EP Search Report for EP Application 19949477.4 mailed Jul. 28, 2022.

* cited by examiner

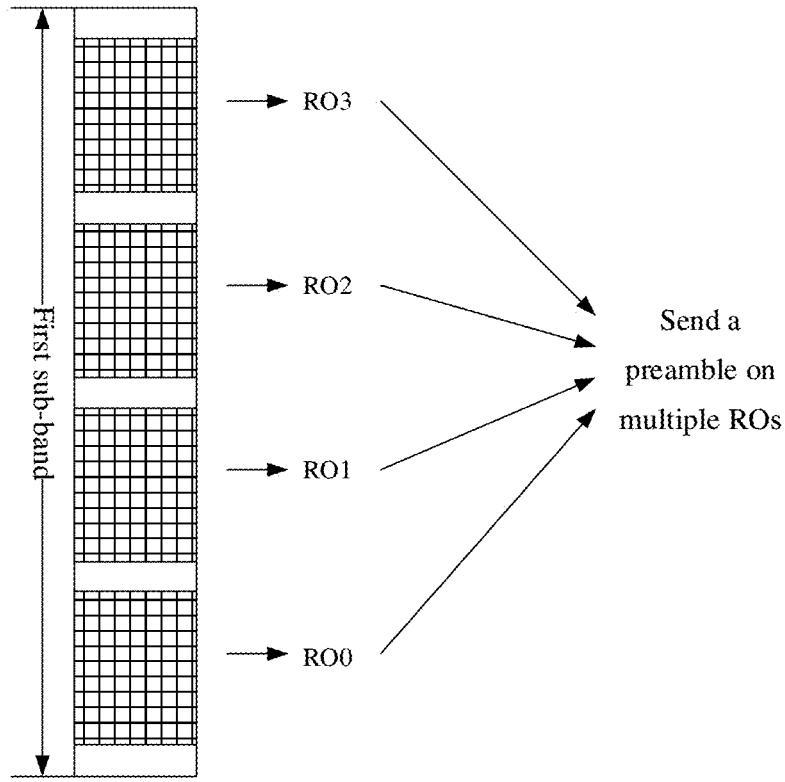

FIG. 3

401
A terminal device sends a preamble on multiple random access resources, and a network device receives a preamble on multiple random access resources 402
The network device determines first resource information associated with the multiple random access resources, and determines an RA-RNTI based on the first resource information, the RA-RNTI being used for scrambling a first PDCCH; the terminal device determines first resource information associated with the multiple random access resources, and determines an RA-RNTI based on the first resource information, the RA-RNTI being used for descrambling a first PDCCH; and the first PDCCH being used for carrying control information of a random access response message corresponding to the preamble and/or the random access resources

FIG. 4

INFORMATION DETERMINATION METHOD AND APPARATUS, AND TERMINAL DEVICE AND NETWORK DEVICE

CROSS-REFERENCE TO RELATED APPLICATION(S)

This application is a continuation application of International Application No. PCT/CN2019/111058, filed on Oct. 14, 2019, the entire disclosure of which is hereby incorporated by reference.

TECHNICAL FIELD

Implementations of the present application relate to the field of mobile communication technologies, in particular to a method and apparatus for determining information, a terminal device, and a network device.

BACKGROUND

On an unlicensed frequency band, different terminal devices may perform channel listening in a manner of Listen Before Talk (LBT) and utilize an idle channel. When a terminal device occupies a channel through LBT, there are accordingly some constraints, such as an Occupied Channel Bandwidth (OCB) requirement.

An OCB requirement of an unlicensed frequency band needs to be considered for a design of random access of a $5^{th}$ Generation (5G) New Radio (NR) system. Therefore, random access is performed by using multiple Random Access Channel (RACH) Occasions (ROs) jointly to send a preamble. However, when random access in an unlicensed frequency band is performed by using multiple ROs to send a preamble, a problem of confusion of a Random Access-Radio Network Temporary Identifier (RA-RNTI) caused by the use of multiple ROs will occur.

SUMMARY

Implementations of the present application provide a method and apparatus for determining information, a terminal device, and a network device.

A method for determining information according to an implementation of the present application includes: sending, by a terminal device, a preamble on multiple random access resources; and determining, by the terminal device, first resource information associated with the multiple random access resources, and determining a Random Access-Radio Network Temporary Identifier (RA-RNTI) based on the first resource information, the RA-RNTI being used for descrambling a first Physical Downlink Control Channel (PDCCH), and the first PDCCH being used for carrying control information of a random access response message corresponding to the preamble and/or the random access resources.

A method for determining information according to an implementation of the present application includes: receiving, by a network device, a preamble on multiple random access resources; and determining, by the network device, first resource information associated with the multiple random access resources, and determining a Random Access-Radio Network Temporary Identifier (RA-RNTI) based on the first resource information, the RA-RNTI being used for scrambling a first Physical Downlink Control Channel (PDCCH), and the first PDCCH being used for carrying control information of a random access response message corresponding to the preamble and/or the random access resources.

An apparatus for determining information according to an implementation of the present application includes: a sending unit, configured to send a preamble on multiple random access resources; and a determining unit, configured to determine first resource information associated with the multiple random access resources, and determine a Random Access-Radio Network Temporary Identifier (RA-RNTI) based on the first resource information, the RA-RNTI being used for descrambling a first Physical Downlink Control Channel (PDCCH), and the first PDCCH being used for carrying control information of a random access response message corresponding to the preamble and/or the random access resources.

An apparatus for determining information according to an implementation of the present application includes: a receiving unit, configured to receive a preamble on multiple random access resources; and a determining unit, configured to determine first resource information associated with the multiple random access resources, and determine a Random Access-Radio Network Temporary Identifier (RA-RNTI) based on the first resource information, the RA-RNTI being used for scrambling a first Physical Downlink Control Channel (PDCCH), and the first PDCCH being used for carrying control information of a random access response message corresponding to the preamble and/or the random access resources.

A terminal device according to an implementation of the present application includes a processor and a memory. The memory is configured to store a computer program, and the processor is configured to call and run the computer program stored in the memory to perform the methods for determining information described above.

A network device according to an implementation of the present application includes a processor and a memory. The memory is configured to store a computer program, and the processor is configured to call and run the computer program stored in the memory to perform the methods for determining information described above.

A chip according to an implementation of the present application is configured to implement the methods for determining information described above.

Specifically, the chip includes: a processor configured to call a computer program from a memory and run the computer program, and a device mounted with the chip is enabled to perform the methods for determining information described above.

A computer-readable storage medium according to an implementation of the present application is configured to store a computer program that enables a computer to perform the methods for determining information described above.

A computer program product according to an implementation of the present application includes computer program instructions that enable a computer to perform the methods for determining information described above.

A computer program according to an implementation of the present application, when run on a computer, enables the computer to perform the methods for determining information described above.

According to the technical solutions of the implementations of the present application, it is achieved that, in a New Radio-Unlicensed (NR-U) system, an OCB requirement on an unlicensed frequency band is met in a manner of sending a preamble using multiple random access resources simultaneously. On the other hand, according to the technical solutions of the implementations of the present application, it is clear for how to determine an RA-RNTI when a terminal device sends a preamble on multiple random access resources simultaneously.

BRIEF DESCRIPTION OF DRAWINGS

Accompanying drawings described herein are intended to provide further understanding of the present application, and form a part of the present application. Illustrative implementations of the present application and descriptions thereof are intended to explain the present application, but do not constitute an inappropriate limitation to the present application. In the accompanying drawings, corresponding descriptions are as follows.

FIG. 3 is a schematic diagram of sending a preamble using multiple ROs jointly according to an implementation of the present application.

FIG. 4 is a schematic flowchart of a method for determining information according to an implementation of the present application.

DETAILED DESCRIPTION

Technical solutions in the implementations of the present application will be described below with reference to the drawings in the implementations of the present application. It is apparent that the implementations described are a part of implementations of the present application, but not all of the implementations of the present application. According to the implementations of the present application, all other implementations achieved by a person of ordinary skills in the art without making inventive efforts belong to the protection scope of the present application.

The technical solutions of the implementations of the present application may be applied to various communication systems, such as a Long Term Evolution (LTE) system, an LTE Frequency Division Duplex (FDD) system, an LTE Time Division Duplex (TDD) system, a system, a 5G system, or a future communication system.

Figure 1:
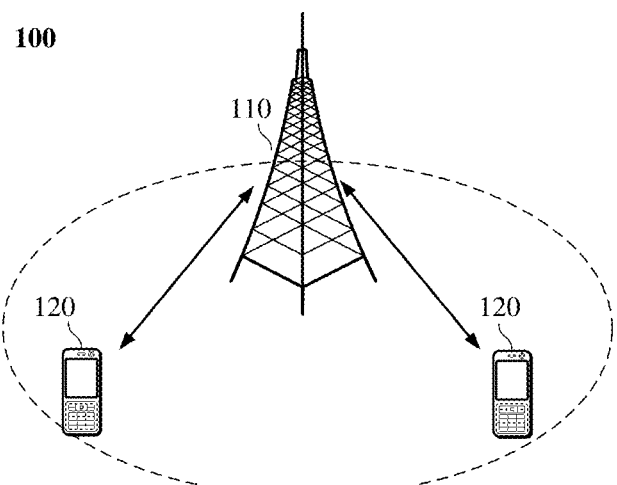
FIG. 1 is a schematic diagram of architecture of a communication system according to an implementation of the present application.

Illustratively, a communication system 100 to which an implementation of the present application is applied is shown in FIG. 1. The communication system 100 may include a network device 110. The network device 110 may be a device that communicates with a terminal 120 (or referred to as a communication terminal, or a terminal). The network device 110 may provide communication coverage for a specific geographical area, and may communicate with a terminal located within the coverage area. Optionally, the network device 110 may be an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future communication system, etc.

The communication system 100 further includes at least one terminal 120 located within the coverage of the network device 110. The "terminal" as used herein includes, but is not limited to, an apparatus configured to receive/send a communication signal via a wired line connection, for example, via a Public Switched Telephone Network (PSTN), a Digital Subscriber Line (DSL), a digital cable, or a direct cable; and/or another data connection/network; and/or via a wireless interface, for example, for a cellular network, a Wireless Local Area Network (WLAN), a digital television network such as a Digital Video Broadcasting Handheld (DVB-H) network, a satellite network, or an Amplitude Modulation-Frequency Modulation (AM-FM) broadcast transmitter; and/or another terminal; and/or an Internet of Things (IoT) device. A terminal configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal which may combine a cellular radio phone with data processing, facsimile, and data communication capabilities; a Personal Digital Assistant (PDA) that may include a radio phone, a pager, Internet/intranet access, a Web browser, a memo pad, a calendar, and/or a Global Positioning System (GPS) receiver; and a conventional laptop and/or palmtop receiver, or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal in a 5G network, or a terminal in a future evolved Public Land Mobile Network (PLMN), etc.

Optionally, Device to Device (D2D) communication may be performed between terminals 120.

Optionally, a 5G communication system or a 5G network may also be referred to as a New Radio (NR) system or an NR network.

FIG. 1 illustrates exemplarily one network device and two terminals. Optionally, the communication system 100 may include a plurality of network devices, and other quantities of terminals may be included within a coverage area of each network device, which is not limited in the implementations of the present application.

Optionally, the communication system 100 may also include another network entity, such as a network controller and a mobile management entity, which is not limited in the implementations of the present application.

It should be understood that a device with a communication function in a network/system in the implementations of the present application may be referred to as a communication device. Taking the communication system 100 shown in FIG. 1 as an example, a communication device may include a network device 110 and a terminal 120 which have communication functions, and the network device 110 and the terminal 120 may be specific devices described above, which will not be repeated herein. The communication device may also include another device in the communication system 100, such as a network controller, a mobile management entity, and another network entity, which is not limited in the implementations of the present application.

It should be understood that the terms "system" and "network" may often be used interchangeably herein. The term "and/or" herein is an association relation describing associated objects only, indicating that three relations may exist, for example, A and/or B may indicate three cases: A alone, both A and B, and B alone. In addition, the symbol "/" herein generally indicates that objects before and after the symbol "/" have an "or" relationship.

In order to facilitate understanding of the technical solutions of the implementations of the present application, the technical solutions related to the implementations of the present application will be explained below.

Working Mechanism of Random Access on a Licensed Frequency Band

Figure 2A:
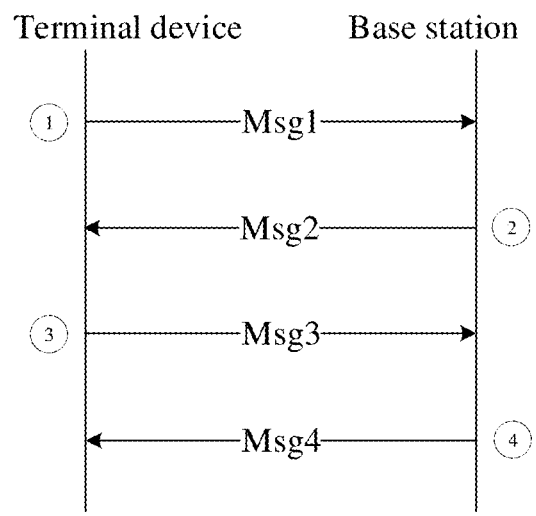
FIG. 2A is a schematic diagram of a contention random access process according to an implementation of the present application.

Referring to FIG. 2A, a contention random access process of a licensed frequency band includes following acts: (1) a terminal device sends Msg1 and monitors Msg2 within a determined time window; (2) after receiving Msg1, a base station feeds back Msg2; (3) after receiving Msg2, the terminal device obtains an uplink grant, then sends Msg3 based on the uplink grant, and monitors Msg4 before a contention resolution timer expires; and (4) after receiving Msg3, the base station feeds back Msg4.

Figure 2B:
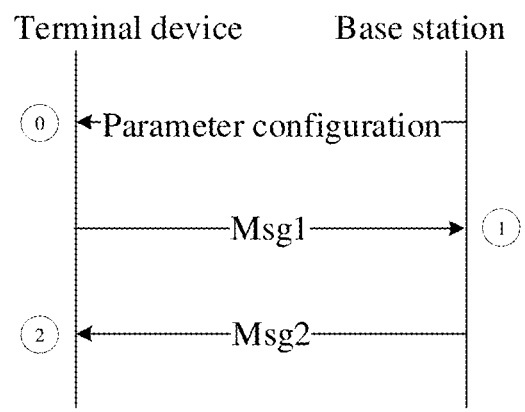
FIG. 2B is a schematic diagram of a non-contention random access process according to an implementation of the present application.

Referring to FIG. 2B, a non-contention random access process of a licensed frequency band includes following acts: (0) a base station configures a terminal device with a parameter configuration required for a non-contention random access; (1) the terminal device sends Msg1 based on the parameter configuration of the base station, and monitors Msg2 within a determined time window; and (2) after receiving Msg1, the base station feeds back Msg2.

Method for Determining an RA-RNTI in a 5G System

In 5G NR, a base station informs, through a system message or a Radio Resource Control (RRC) signaling, a terminal device of configuration information required for random access, which mainly includes two parts: preamble information and random access resource information.

Specifically, for the random access resource information, the configuration information that the terminal device may obtain includes following 1) and 2).

1) A Period of RO and a Position of RO in the Period

Specifically, a network side pre-configures a table which includes multiple pieces of configuration information (each piece of configuration information is used for determining one piece of time domain resource information), and then the network side indicates, through Physical Random Access Channel (PRACH) configuration indication information (prach-ConfigurationIndex), which piece of configuration information in the table is currently used by a terminal device specifically.

2) A Quantity of ROs in a Frequency Domain

Specifically, the quantity of ROs in the frequency domain (e.g., a quantity of PRACH transmission resources that are Frequency Division Multiplexed (FDMed) in one time instance) is expressed through a parameter msg1-FDM.

In a random access process, a terminal device will select a random access resource (i.e., RO) and send a preamble on the RO. After a base station detects a preamble on an RO, the base station also determines the RO where the preamble is located, and then determines an RA-RNTI according to time-frequency resource information of the RO. A formula for calculating an RA-RNTI is as follows.

$$\text{RA-RNTI}=1+s\_id+14\times t\_id+14\times 80\times f\_id+14\times 80\times 8\times ul\_carrier\_id$$

In this formula, $s\_id$ is an index of a first Orthogonal Frequency Division Multiplexing (OFDM) symbol of an RO; $t\_id$ is an index of a first time slot of an RO in a system frame; $f\_id$ is an index of an RO in a frequency domain, on a same time domain resource, there may be multiple (e.g., msg1-FDM) ROs located on different frequency domain resources; and $ul\_carrier\_id$ is an index of an uplink carrier of transmission of a preamble; wherein for a Normal Uplink (NUL) carrier, a value of $ul\_carrier\_id$ is 0; and for a Supplementary Uplink (SUL) carrier, a value of $ul\_carrier\_id$ is 1.

After determining an RA-RNTI through the above method, a base station scrambles, using the RA-RNTI, a Random Access Response (RAR) message corresponding to a preamble.

Requirement for Bandwidth Utilization on an Unlicensed Frequency Band

On an unlicensed frequency band, different terminal devices may listen to a channel through LBT and utilize an idle channel. When a terminal device occupies a channel through LBT, there are accordingly some constraints, such as an OCB requirement. Specifically, after a terminal device occupies a channel, it cannot use only a part of the channel when using the channel. For example, when a terminal device occupies a channel of 20 MHz through LBT, it is not expected that the terminal device uses only 4 MHz of a bandwidth of the 20 MHz.

A minimum bandwidth of an unlicensed frequency band is 20 MHz. In a design of random access for a 5G NR system, some problems will be found when an OCB requirement of the unlicensed frequency band is considered. For example, when an RO includes 144 subcarriers (each subcarrier is 30 kHz), i.e., 12 Resource Blocks (RBs), a bandwidth occupied by the RO is only 4.32 MHz, which obviously cannot meet a requirement of an OCB.

For the above problem, one solution is to use multiple ROs to jointly send a preamble, as shown in FIG. 3, using this method, an OCB requirement of an NR-U system may be met on a basis of multiplexing the aforementioned RO design.

However, after further analysis, it is found that a corresponding problem after adopting the above method is a problem of confusion of an RA-RNTI. In an NR system, when sending a preamble, a terminal device only uses one RO as a transmission resource of the preamble, and a corresponding method for determining RA-RNTI is also associated with a time-frequency resource position of the RO.

If a terminal device sends a preamble on multiple ROs simultaneously, how to determine an RA-RNTI will accordingly be a problem to be solved further. For example, as shown in FIG. 3, a terminal device has sent a preamble on four ROs, and both the terminal device and a base station need to know clearly how to determine one unique RA-RNTI based on resource positions of the four ROs.

To sum up, when random access on an unlicensed frequency band is performed in a manner of using multiple ROs to send a preamble, a problem of confusion of an RA-RNTI caused by the use of multiple ROs will occur. In view of this, an implementation of the present application provides a solution for determining an RA-RNTI on an unlicensed frequency band. The technical solutions of the implementations of the present application will be described below.

FIG. 4 is a schematic flowchart of a method for determining information according to an implementation of the present application. As shown in FIG. 4, the method for determining information includes acts 401 and 402.

In act 401, a terminal device sends a preamble on multiple random access resources, and a network device receives a preamble on multiple random access resources.

The technical solutions of the implementations of the present application may be applied, but is not limited, to a contention random access process of an unlicensed frequency band and a non-contention random access process of an unlicensed frequency band.

In an implementation of the present application, a terminal device selects multiple random access resources from configured candidate random access resources, and sends a preamble on the selected multiple random access resources. Accordingly, a network device may receive, on the multiple random access resources, the preamble sent by the terminal device.

In an implementation of the present application, the network device may be a base station, e.g., a Next Generation Node B (gNB).

In an optional implementation of the present application, the random access resources may be ROs, and all of the description of a random access resource involved in the implementations of the present application may be replaced by an RO. It should be noted that in the implementations of the present application, a name of the random access resource is not limited, for example, the name of the random access resource may be a PRACH resource, or a PRACH occasion, etc.

In act 402, the network device determines first resource information associated with the multiple random access resources, and determines an RA-RNTI based on the first resource information, the RA-RNTI being used for scrambling a first Physical Downlink Control Channel (PDCCH); the terminal device determines first resource information associated with the multiple random access resources, and determines an RA-RNTI based on the first resource information, the RA-RNTI being used for descrambling a first PDCCH; and the first PDCCH being used for carrying control information of a random access response message corresponding to the preamble and/or the random access resources.

In an implementation of the present application, for a network device, the network device needs to determine an RA-RNTI, and scrambles a random access response message corresponding to the preamble through the RA-RNTI; and for a terminal device, the terminal device needs to determine an RA-RNTI, and descrambles a random access response message corresponding to the preamble through the RA-RNTI.

In an implementation of the present application, a mode of determining an RA-RNTI is the same for both a network device and a terminal device, e.g., the RA-RNTI is determined based on first resource information associated with the multiple random access resources. How to determine an RA-RNTI is described in detail below.

Mode I

The multiple random access resources are distributed in a first sub-band. First resource information associated with the multiple random access resources refers to index information of a first random access resource among the multiple random access resources. Optionally, the first random access resource is a random access resource with a smallest index value among the multiple random access resources.

Figure 5A:
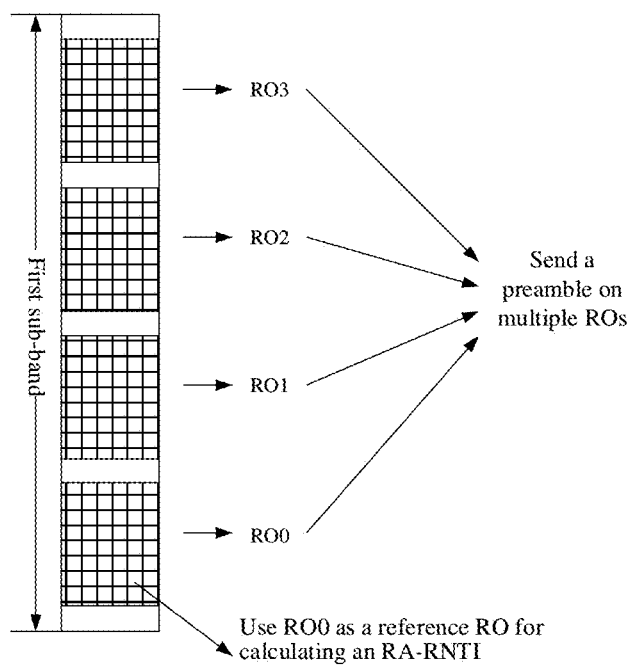
FIG. 5A is a first schematic diagram of distribution of ROs according to an implementation of the present application.

For example, referring to FIG. 5A, taking a case where random access resources are ROs as an example, when a terminal device sends Msg1 of a random access process, if the terminal device sends a preamble on multiple ROs in a frequency domain, corresponding RA-RNTI determination is to use an RO with a smallest index value as a reference RO for calculating an RA-RNTI. For example, the terminal device sends a preamble on RO0, RO1, RO2, and RO3, then, when calculating an RA-RNTI, RO0 is used as a reference RO for calculating the RA-RNTI.

Specifically, for a formula for calculating an RA-RNTI, the definition of f_id needs to be modified as a smallest index value of an RO in a frequency domain.

Mode II

The multiple random access resources are distributed in a first sub-band. First resource information associated with the multiple random access resources refers to index information of a first random access resource among the multiple random access resources. Optionally, the first random access resource is a random access resource with a largest index value among the multiple random access resources.

Figure 5B:
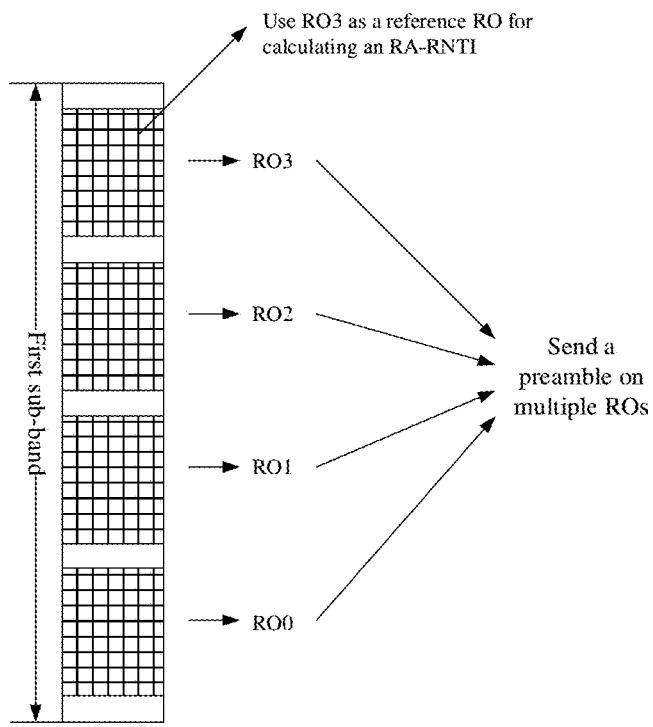
FIG. 5B is a second schematic diagram of distribution of ROs according to an implementation of the present application.

For example, referring to FIG. 5B, taking a case where random access resources are ROs as an example, when a terminal device sends Msg1 of a random access process, if the terminal device sends a preamble on multiple ROs in a frequency domain, corresponding RA-RNTI determination is to use an RO with a largest index value as a reference RO for calculating an RA-RNTI. For example, the terminal device sends a preamble on RO0, RO1, RO2, and RO3, then, when calculating an RA-RNTI, RO3 is used as a reference RO for calculating the RA-RNTI.

Specifically, for a formula for calculating an RA-RNTI, the definition of f_id needs to be modified as a largest index value of an RO in a frequency domain.

Mode III

The multiple random access resources are distributed in a first sub-band. First sub-band includes multiple random access resource groups, and the multiple random access resources belong to a first random access resource group among the multiple random access resource groups; and the first resource information associated with the multiple random access resources refers to index information of the first random access resource group.

It should be noted that the "first random access resource group" here may refer to any random access resource group among the multiple random access resource groups, and this random access resource group is a random access resource group selected by a terminal device for sending a preamble. In other words, a random access resource group to which multiple random access resources selected by a terminal device for sending a preamble belong is denoted as a first random access resource group.

In an optional implementation of the present application, each random access resource group in the multiple random access resource groups includes N random access resources, N being an integer greater than 1; wherein the N random access resources in each random access resource group are continuously distributed in a frequency domain; or the N random access resources in each random access resource group are discontinuously distributed in a frequency domain. Further, a value of N is configured through a broadcast message; or a value of N is configured through an RRC signaling; or a value of N is predefined.

It should be noted that the N random access resources being continuously distributed in the frequency domain means that there is no other random access resource spaced between the N random access resources in the frequency domain; and the N random access resources being discontinuously distributed in the frequency domain means that there are other random access resources spaced between the N random access resources in the frequency domain.

Figure 5C:
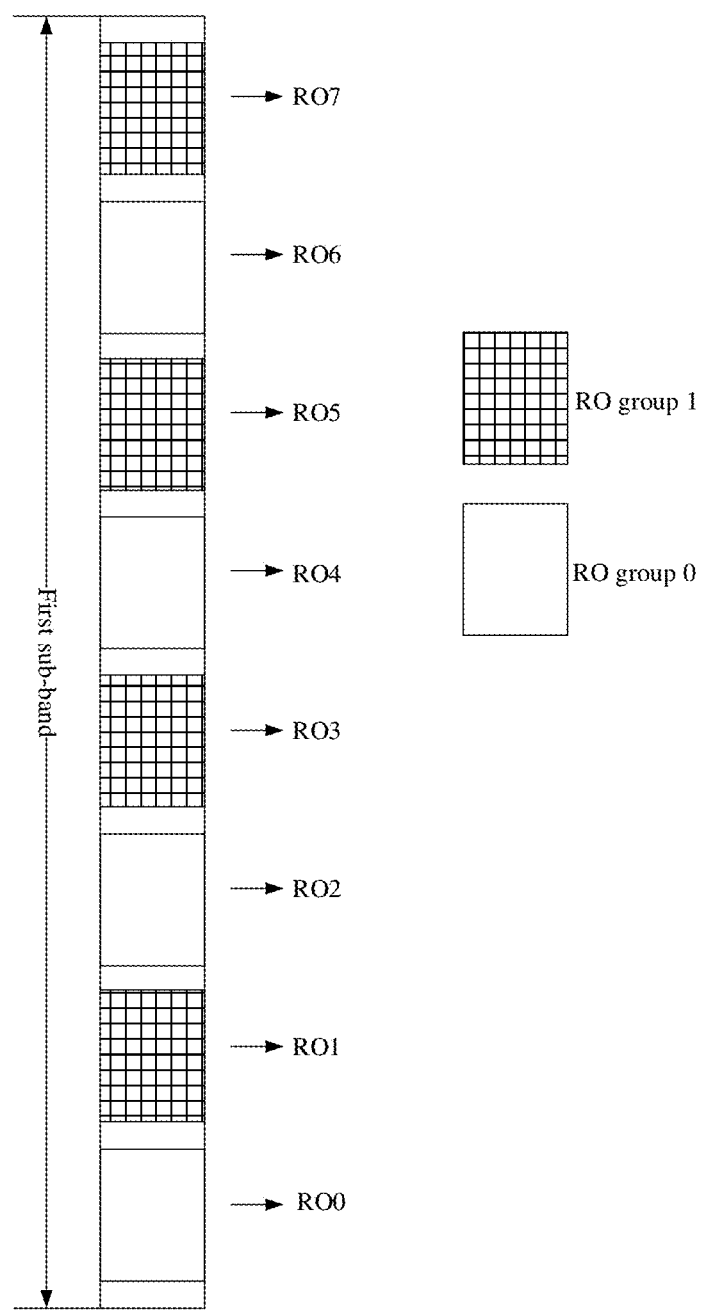
FIG. 5C is a third schematic diagram of distribution of ROs according to an implementation of the present application.

For example, referring to FIG. 5C, taking a case where random access resources are ROs as an example, FIG. 5C provides an RO grouping mode, i.e., N ROs in each RO group are distributed discontinuously in a frequency domain. In a sub-band (e.g., a first sub-band), when a terminal device sends Msg1 of a random access process, if the terminal device sends a preamble on multiple ROs in the frequency domain and the multiple ROs belong to an RO group (e.g., a first RO group) among multiple RO groups in the first sub-band, corresponding RA-RNTI determination is to calculate an RA-RNTI by using an index value of the first RO group. For example, there are totally 8 ROs in a frequency domain in the first sub-band, then ROs with even index values may be taken as one group (RO0, RO2, RO4, and RO8 belong to RO group 0), and ROs with odd index values may be taken as one group (RO1, RO3, RO5, and RO7 belong to RO group 1), and when a terminal device sends a preamble on RO1, RO3, RO5, and RO7, when calculating an RA-RNTI, an index value of RO group 1 is used for calculating the RA-RNTI.

Specifically, for a formula for calculating an RA-RNTI, the definition of f_id needs to be modified as an index value of an RO group in a frequency domain.

Mode IV

The multiple random access resources are distributed in a first frequency domain range, and the first frequency domain range includes multiple random access resource groups. The multiple random access resources belong to a first random access resource group among the multiple random access resource groups; and first resource information associated with the multiple random access resources refers to index information of the first random access resource group.

It should be noted that the "first random access resource group" here may refer to any random access resource group among the multiple random access resource groups, and this random access resource group is a random access resource group selected by a terminal device for sending a preamble. In other words, a random access resource group to which multiple random access resources selected by a terminal device for sending a preamble belong is denoted as a first random access resource group.

In an optional implementation of the present application, each random access resource group in the multiple random access resource groups includes N random access resources, N being an integer greater than 1; wherein the N random access resources in each random access resource group are continuously distributed in a frequency domain; or the N random access resources in each random access resource group are discontinuously distributed in a frequency domain. Further, a value of N is configured through a broadcast message; or a value of N is configured through an RRC signaling; or a value of N is predefined.

It should be noted that the N random access resources being continuously distributed in the frequency domain means that there is no other random access resource spaced between the N random access resources in the frequency domain; and the N random access resources being discontinuously distributed in the frequency domain means that there are other random access resources spaced between the N random access resources in the frequency domain.

Figure 5D:
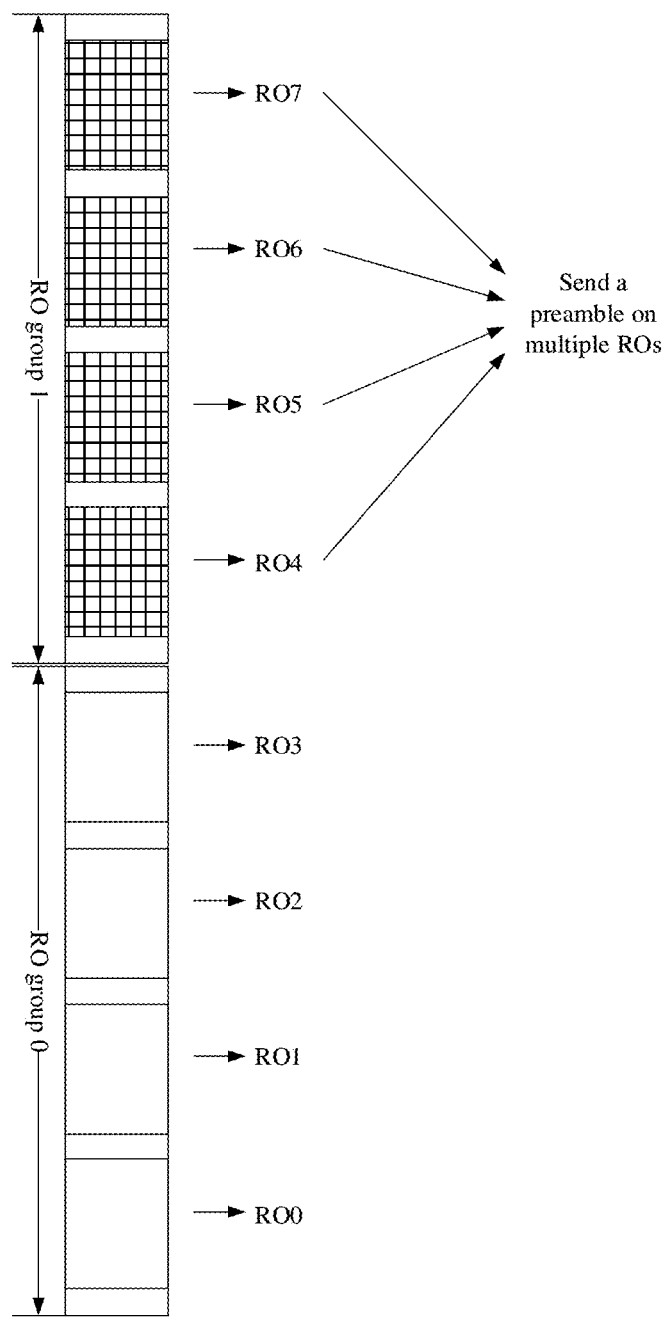
FIG. 5D is a fourth schematic diagram of distribution of ROs according to an implementation of the present application.

For example, referring to FIG. 5D, taking a case where random access resources are ROs as an example, FIG. 5D provides an RO grouping mode, i.e., N ROs in each RO group are distributed continuously in a frequency domain. A network side (i.e., a base station) configures K RO basic resources for a terminal device in a frequency domain, K being a positive integer. The K RO basic resources are divided into M groups, i.e., there are M RO groups, and each RO group consists of N continuous RO basic resources. When the terminal device sends Msg1 of a random access process, the terminal device sends a preamble on multiple ROs in the frequency domain, the multiple ROs are an RO group (denoted as a first RO group) among multiple ROs groups, and corresponding RA-RNTI determination is to calculate an RA-RNTI by using an index value of the first RO group. For example, a total of two RO groups (RO group 0 and RO group 1) are configured, there are four RO basic resources in each RO group, when a terminal device sends a preamble on RO group 1, then, when calculating an RA-RNTI, an index value of the RO group 1 is used for calculating the RA-RNTI.

Specifically, for a formula for calculating an RA-RNTI, the definition of f_id needs to be modified as an index value of an RO group in a frequency domain.

In an optional implementation, an index value of any RO in an RO group is divided by the N and then rounded down to obtain an index value of the RO group. For example, as shown in FIG. 5D, an index value 7 of RO7 is divided by 4 and then rounded down to obtain 1, which is an index value of RO group 1.

Mode V

The multiple random access resources are distributed in a first frequency domain range, and the first frequency domain range includes multiple random access resource groups. The first frequency domain range includes multiple sub-bands, the multiple random access resource groups in the first frequency domain range are distributed in the multiple sub-bands, and numbers of the multiple random access resource groups are unique in the first frequency domain range. The multiple random access resources are random access resources in a first random access resource group among the multiple random access resource groups. First resource information associated with the multiple random access resources refers to index information of the first random access resource group.

It should be noted that the "first random access resource group" here may refer to any random access resource group among the multiple random access resource groups, and this random access resource group is a random access resource group selected by a terminal device for sending a preamble. In other words, a random access resource group to which multiple random access resources selected by a terminal device for sending a preamble belong is denoted as a first random access resource group.

In an optional implementation of the present application, each random access resource group in the multiple random access resource groups includes N random access resources, N being an integer greater than 1; wherein the N random access resources in each random access resource group are continuously distributed in a frequency domain; or the N random access resources in each random access resource group are discontinuously distributed in a frequency domain. Further, a value of N is configured through a broadcast message; or a value of N is configured through an RRC signaling; or a value of N is predefined.

It should be noted that the N random access resources being continuously distributed in the frequency domain means that there is no other random access resource spaced between the N random access resources in the frequency domain; and the N random access resources being discontinuously distributed in the frequency domain means that there are other random access resources spaced between the N random access resources in the frequency domain.

Figure 5E:
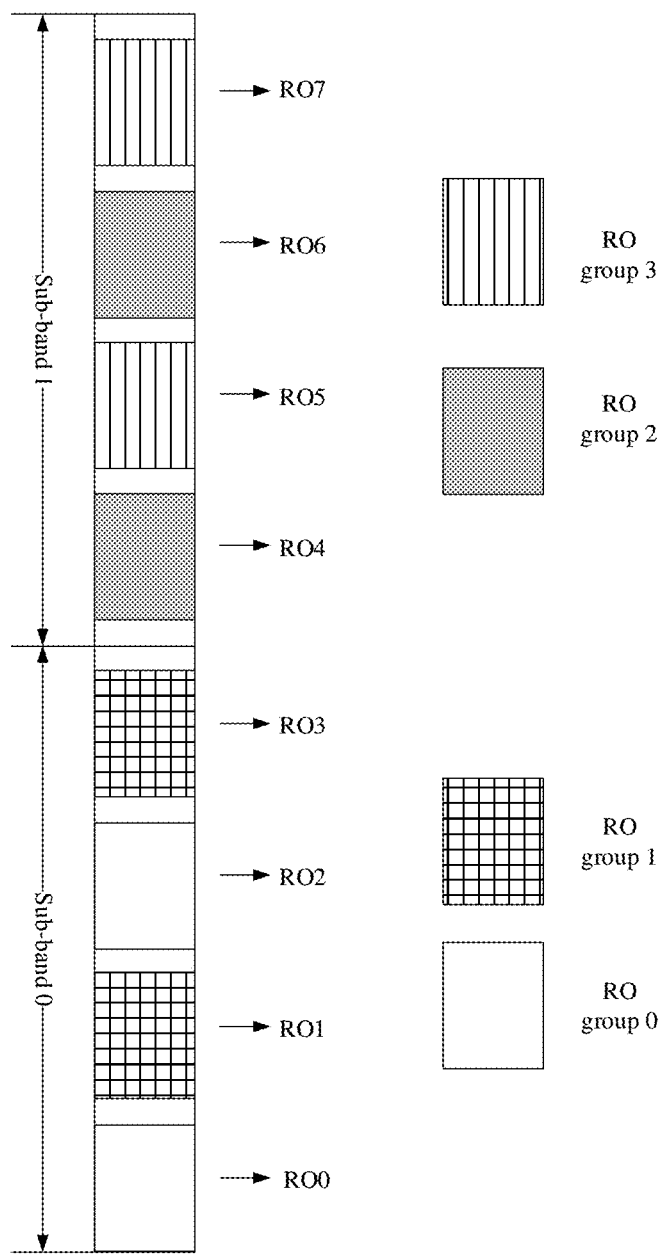
FIG. 5E is a fifth schematic diagram of distribution of ROs according to an implementation of the present application.

For example, referring to FIG. 5E, taking a case where random access resources are ROs as an example, FIG. 5E provides an RO grouping mode, i.e., N ROs in each RO group are distributed discontinuously in a frequency domain. A network side (i.e., a base station) configures 2K RO basic resources for a terminal device in a frequency domain, K being a positive integer. The 2K RO basic resources are distributed in bandwidths of two sub-bands (i.e., sub-band 0 and sub-band 1). K RO basic resources in each sub-band are divided into two groups, ROs with odd index values forming one group and ROs with even index values forming the other group. When a terminal device sends Msg1 of a random access process, if the terminal device sends a preamble on multiple ROs in a frequency domain and the multiple ROs are an RO group (denoted as a first RO group) of two RO groups in a sub-band, corresponding RA-RNTI determination is to calculate an RA-RNTI by using an index value of the first RO group. For example, 8 ROs are configured on two sub-bands (sub-band 0 and sub-band 1), 4 ROs on each sub-band are divided into groups, ROs with even index values are divided into one group and ROs with odd index values are divided into one group. Specifically, RO0 and RO2 in sub-band 0 belong to RO group 0, RO1 and RO3 in sub-band 0 belong to RO group 1, RO4 and RO6 in sub-band 1 belong to RO group 2, and RO5 and RO7 in sub-band 1 belong to RO group 3. When the terminal device sends a preamble on RO1 and RO3 of sub-band 0, then when calculating an RA-RNTI, an index value of RO group 1 is used for determining the RA-RNTI.

Specifically, for a formula for calculating an RA-RNTI, the definition of f_id needs to be modified as an index value of an RO group in a frequency domain.

Mode VI

The multiple random access resources are distributed in a first frequency domain range, and the first frequency domain range includes multiple random access resource groups. The first frequency domain range includes multiple sub-bands, the multiple random access resource groups in the first frequency domain range are distributed in the multiple sub-bands, each sub-band in the multiple sub-bands includes M random access resource groups, numbers of the M random access resource groups in each sub-band are unique in the sub-band, M being a positive integer greater than 1; the multiple random access resources belong to a first random access resource group in the first sub-band; and first resource information associated with the multiple random access resources refers to index information of the first sub-band and index information of the first random access resource group.

It should be noted that the "first random access resource group" here may refer to any random access resource group among the multiple random access resource groups, and this random access resource group is a random access resource group selected by a terminal device for sending a preamble. In other words, a random access resource group to which multiple random access resources selected by a terminal device for sending a preamble belong is denoted as a first random access resource group.

In an optional implementation of the present application, each random access resource group in the multiple random access resource groups includes N random access resources, N being an integer greater than 1; wherein the N random access resources in each random access resource group are continuously distributed in a frequency domain; or the N random access resources in each random access resource group are discontinuously distributed in a frequency domain. Further, a value of N is configured through a broadcast message; or a value of N is configured through an RRC signaling; or a value of N is predefined.

It should be noted that the N random access resources being continuously distributed in the frequency domain means that there is no other random access resource spaced between the N random access resources in the frequency domain; and the N random access resources being discontinuously distributed in the frequency domain means that there are other random access resources spaced between the N random access resources in the frequency domain.

Figure 5F:
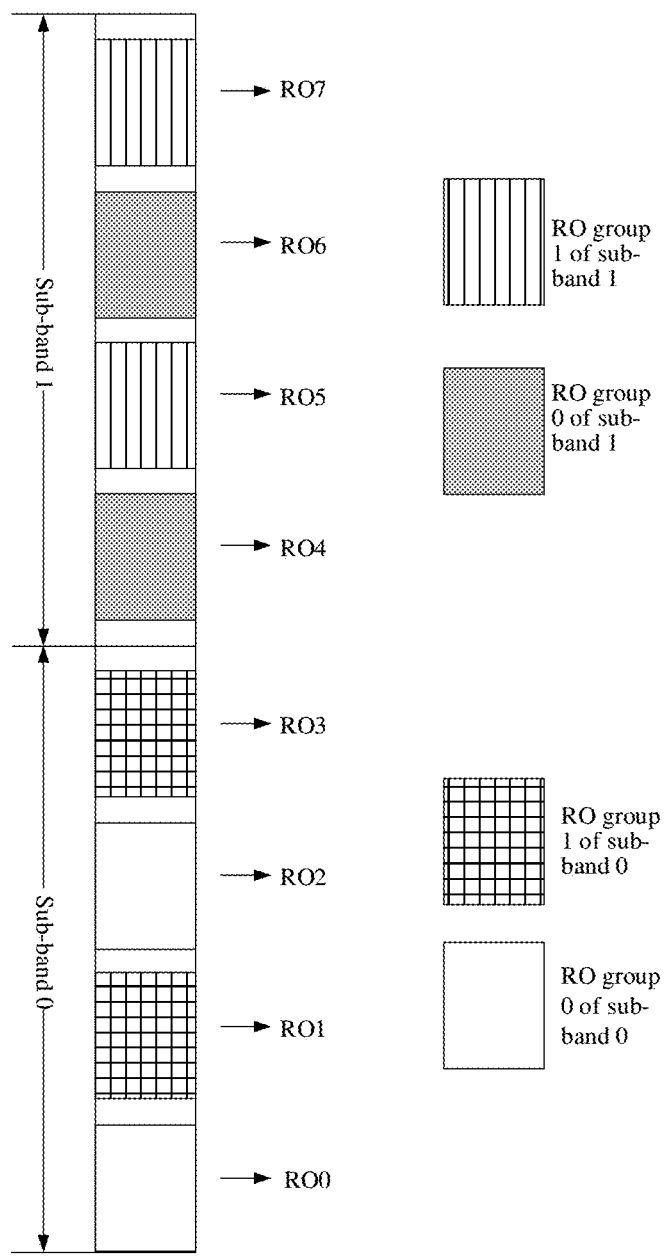
FIG. 5F is a sixth schematic diagram of distribution of ROs according to an implementation of the present application.

For example, referring to FIG. 5F, taking a case where random access resources are ROs as an example, FIG. 5F provides an RO grouping mode, i.e., N ROs in each RO group are distributed discontinuously in a frequency domain. A network side (i.e., a base station) configures 2K RO basic resources for a terminal device in a frequency domain, K being a positive integer. The 2K RO basic resources are distributed in bandwidths of two sub-bands (i.e., sub-band 0 and sub-band 1). K RO basic resources in each sub-band are divided into two groups, ROs with odd index values forming one group and ROs with even index values forming the other group. When the terminal device sends Msg1 of a random access process, if the terminal device sends a preamble on multiple ROs in a frequency domain and the multiple ROs are an RO group (denoted as a first RO group) of two RO groups in a sub-band (denoted as a first sub-band), corresponding RA-RNTI determination is to calculate an RA-RNTI by using an index value of the first sub-band and an index value of the first RO group. For example, 8 ROs are configured on two sub-bands (sub-band 0 and sub-band 1), 4 ROs on each sub-band are divided into groups, ROs with even index values are divided into one group and ROs with odd index values are divided into one group. Specifically, RO0 and RO2 in sub-band 0 belong to RO group 0 of sub-band 0, RO1 and RO3 in sub-band 0 belong to RO group 1 of sub-band 0, RO4 and RO6 in sub-band 1 belong to RO group 0 of sub-band 1, and RO5 and RO7 in sub-band 1 belong to RO group 1 of sub-band 1. When the terminal device sends a preamble on RO1 and RO3 of sub-band 0, then when calculating an RA-RNTI, an index value of sub-band 0 and an index value of RO group 1 are used for determining the RA-RNTI.

Specifically, for a formula for calculating an RA-RNTI, the definition of f_id needs to be modified as an index value that is commonly determined according to an index value of a sub-band and an index value of an RO group in a frequency domain. For example, fid is defined as (an index value of a sub-band)*(a quantity of RO groups in the sub-band)+(an index value of an RO group in the sub-band) in a frequency domain. Taking FIG. 5F as an example, f_id=0 (an index value of a sub-band)*2 (a quantity of RO groups in the sub-band)+1 (an index value of an RO group in the sub-band)=1.

In an implementation of the present application, the determining the RA-RNTI based on the first resource information includes: calculating the RA-RNTI by using the first resource information as a frequency domain identification parameter (i.e., f_id). Here, for a formula for calculating the RA-RNTI, reference may be made to the foregoing related description.

According to the technical solutions of the implementations of the present application, a solution for determining an RA-RNTI when a terminal device sends a preamble on multiple random access resources simultaneously is provided, and specific analysis is made for different sending solutions of multiple random access resources. Based on the above solutions, a problem of confusion of an RA-RNTI caused by sending a preamble using multiple random access resources may be effectively avoided.

Figure 6:
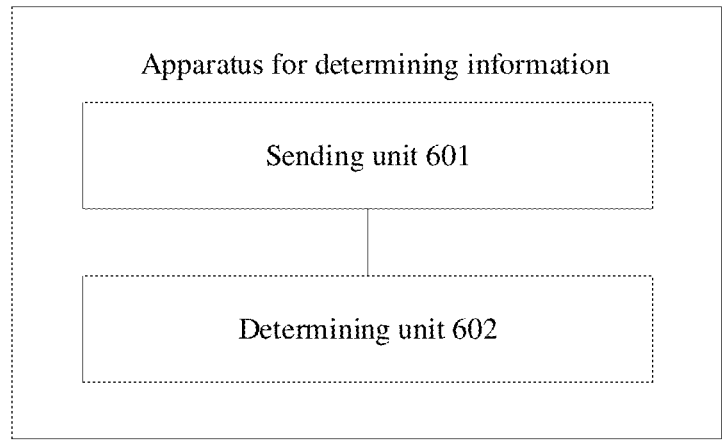
FIG. 6 is a first schematic diagram of a structural composition of an apparatus for determining information according to an implementation of the present application.

FIG. 6 is a first schematic diagram of a structural composition of an apparatus for determining information according to an implementation of the present application, which is applied to a terminal device. As shown in FIG. 6, the apparatus for determining information includes a sending unit 601 and a determining unit 602.

The sending unit 601 is configured to send a preamble on multiple random access resources.

The determining unit 602 is configured to determine first resource information associated with the multiple random access resources, and determine an RA-RNTI based on the first resource information, the RA-RNTI being used for descrambling a first Physical Downlink Control Channel (PDCCH), and the first PDCCH being used for carrying control information of a random access response message corresponding to the preamble and/or the random access resources.

In an optional implementation, the multiple random access resources are distributed in a first sub-band.

In an optional implementation, the first resource information associated with the multiple random access resources refers to index information of a first random access resource among the multiple random access resources.

In an optional implementation, the first random access resource is a random access resource with a smallest index value among the multiple random access resources.

In an optional implementation, the first random access resource is a random access resource with a largest index value among the multiple random access resources.

In an optional implementation, the first sub-band includes multiple random access resource groups, and the multiple random access resources belong to a first random access resource group among the multiple random access resource groups; and the first resource information associated with the multiple random access resources refers to index information of the first random access resource group.

In an optional implementation, the multiple random access resources are distributed in a first frequency domain range, and the first frequency domain range includes multiple random access resource groups.

In an optional implementation, the multiple random access resources belong to a first random access resource group among the multiple random access resource groups; and the first resource information associated with the multiple random access resources refers to index information of the first random access resource group.

In an optional implementation, the first frequency domain range includes multiple sub-bands, the multiple random access resource groups in the first frequency domain range are distributed in the multiple sub-bands, and numbers of the multiple random access resource groups are unique in the first frequency domain range; the multiple random access resources are random access resources in a first random access resource group among the multiple random access resource groups; and the first resource information associated with the multiple random access resources refers to index information of the first random access resource group.

In an optional implementation, the first frequency domain range includes multiple sub-bands, the multiple random access resource groups in the first frequency domain range are distributed in the multiple sub-bands, each sub-band in the multiple sub-bands includes M random access resource groups, numbers of the M random access resource groups in each sub-band are unique in the sub-band, M being a positive integer greater than 1; the multiple random access resources belong to a first random access resource group in the first sub-band; and the first resource information associated with the multiple random access resources refers to index information of the first sub-band and index information of the first random access resource group.

In an optional implementation, each random access resource group in the multiple random access resource groups includes N random access resources, N being an integer greater than 1; wherein the N random access resources in each random access resource group are continuously distributed in a frequency domain; or the N random access resources in each random access resource group are distributed discontinuously in a frequency domain.

In an optional implementation, a value of N is configured through a broadcast message; or a value of N is configured through an RRC signaling; or a value of N is predefined.

In an optional implementation, the determining unit 602 is configured to calculate the RA-RNTI by using the first resource information as a frequency domain identification parameter.

Those skilled in the art should understand that related description of the apparatus for determining information in the implementation of the present application may be understood with reference to the related description of the method for determining information in the implementation of the present application.

Figure 7:
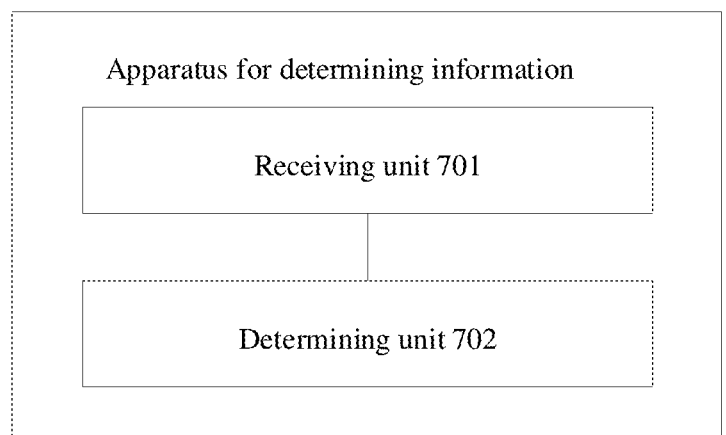
FIG. 7 is a second schematic diagram of a structural composition of an apparatus for determining information according to an implementation of the present application.

FIG. 7 is a second schematic diagram of a structural composition of an apparatus for determining information according to an implementation of the present application, which is applied to a network device. As shown in FIG. 7, the apparatus for determining information includes a receiving unit 701 and a determining unit 702.

The receiving unit 701 is configured to receive a preamble on multiple random access resources.

The determining unit 702 is configured to determine first resource information associated with multiple random access resources, and determine an RA-RNTI based on the first resource information, the RA-RNTI being used for scrambling a first PDCCH, and the first PDCCH being used for carrying control information of a random access response message corresponding to the preamble and/or the random access resources.

In an optional implementation, the multiple random access resources are distributed in a first sub-band.

In an optional implementation, the first resource information associated with the multiple random access resources refers to index information of a first random access resource among the multiple random access resources.

In an optional implementation, the first random access resource is a random access resource with a smallest index value among the multiple random access resources.

In an optional implementation, the first random access resource is a random access resource with a largest index value among the multiple random access resources.

In an optional implementation, the first sub-band includes multiple random access resource groups, and the multiple random access resources belong to a first random access resource group among the multiple random access resource groups; and the first resource information associated with the multiple random access resources refers to index information of the first random access resource group.

In an optional implementation, the multiple random access resources are distributed in a first frequency domain range, and the first frequency domain range includes multiple random access resource groups.

In an optional implementation, the multiple random access resources belong to a first random access resource group among the multiple random access resource groups; and the first resource information associated with the multiple random access resources refers to index information of the first random access resource group.

In an optional implementation, the first frequency domain range includes multiple sub-bands, the multiple random access resource groups in the first frequency domain range are distributed in the multiple sub-bands, and numbers of the multiple random access resource groups are unique in the first frequency domain range; the multiple random access resources are random access resources in a first random access resource group among the multiple random access resource groups; and the first resource information associated with the multiple random access resources refers to index information of the first random access resource group.

In an optional implementation, the first frequency domain range includes multiple sub-bands, the multiple random access resource groups in the first frequency domain range are distributed in the multiple sub-bands, each sub-band in the multiple sub-bands includes M random access resource groups, numbers of the M random access resource groups in each sub-band are unique in the sub-band, M being a positive integer greater than 1; the multiple random access resources belong to a first random access resource group in a first sub-band; and the first resource information associated with the multiple random access resources refers to index information of the first sub-band and index information of the first random access resource group.

In an optional implementation, each random access resource group in the multiple random access resource groups includes N random access resources, N being an integer greater than 1; wherein the N random access resources in each random access resource group are continuously distributed in a frequency domain; or the N random access resources in each random access resource group are distributed discontinuously in a frequency domain.

In an optional implementation, a value of N is configured through a broadcast message; or a value of N is configured through an RRC signaling; or a value of N is predefined.

In an optional implementation, the determining unit 702 is configured to calculate the RA-RNTI by using the first resource information as a frequency domain identification parameter.

Those skilled in the art should understand that related description of the apparatus for determining information in the implementation of the present application may be understood with reference to the related description of the method for determining information in the implementation of the present application.

Figure 8:
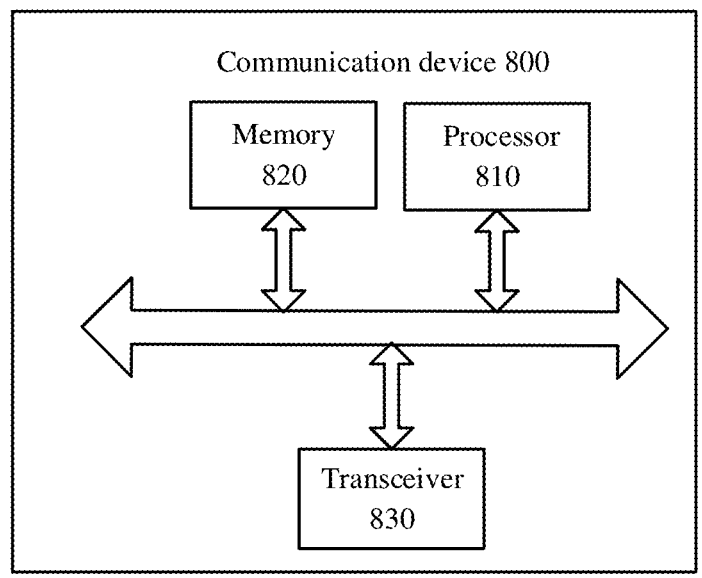
FIG. 8 is a schematic diagram of a structure of a communication device according to an implementation of the present application.

FIG. 8 is a schematic diagram of a structure of a communication device 800 according to an implementation of the present application. The communication device may be a terminal device or a network device. The communication device 800 shown in FIG. 8 includes a processor 810, which may call and run a computer program from a memory to implement the methods in the implementations of the present application.

Optionally, as shown in FIG. 8, the communication device 800 may further include a memory 820. The processor 810 may call and run a computer program from the memory 820 to implement the methods in the implementations of the present application.

The memory 820 may be a separate device independent of the processor 810, or may be integrated in the processor 810.

Optionally, as shown in FIG. 8, the communication device 800 may further include a transceiver 830, and the processor 810 may control the transceiver 830 to communicate with another device. Specifically, the transceiver 830 may send information or data to another device or receive information or data sent by another device.

The transceiver 830 may include a transmitter and a receiver. The transceiver 830 may further include antennas, a quantity of which may be one or more.

Optionally, the communication device 800 may be specifically the network device in the implementations of the present application, and the communication device 800 may implement corresponding processes implemented by the network device in various methods in the implementations of the present application, which will not be repeated here for brevity.

Optionally, the communication device 800 may be specifically the mobile terminal/terminal device in the implementations of the present application, and the communication device 800 may implement corresponding processes implemented by the mobile terminal/terminal device in various methods in the implementations of the present application, which will not be repeated here for brevity.

Figure 9:
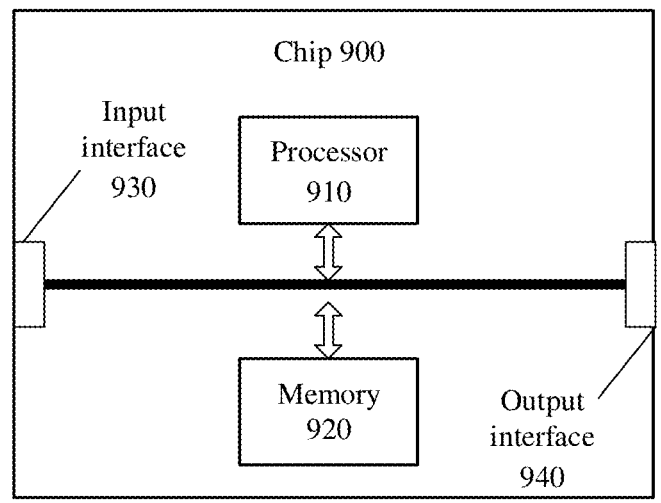
FIG. 9 is a schematic diagram of a structure of a chip according to an implementation of the present application.

FIG. 9 is a schematic diagram of a structure of a chip according to an implementation of the present application. The chip 900 shown in FIG. 9 includes a processor 910, which may call and run a computer program from a memory to implement the methods in the implementations of the present application.

Optionally, as shown in FIG. 9, the chip 900 may further include a memory 920. The processor 910 may call and run a computer program from the memory 920 to implement the methods in the implementations of the present application.

The memory 920 may be a separate device independent of the processor 910, or may be integrated in the processor 910.

Optionally, the chip 900 may further include an input interface 930. The processor 910 may control the input interface 930 to communicate with another device or chip. Specifically, the processor 910 may obtain information or data sent by another device or chip.

Optionally, the chip 900 may further include an output interface 940. The processor 910 may control the output interface 940 to communicate with another device or chip. Specifically, the processor 910 may output information or data to another device or chip.

Optionally, the chip may be applied to the network device in the implementations of the present application, and the chip may implement corresponding processes implemented by the network device in various methods in the implementations of the present application, which will not be repeated here for brevity.

Optionally, the chip may be applied to the mobile terminal/terminal device in the implementations of the present application, and the chip may implement corresponding processes implemented by the mobile terminal/terminal device in various methods in the implementations of the present application, which will not be repeated here for brevity.

It should be understood that the chip mentioned in the implementations of the present application may also be referred to as a system-level chip, a system chip, a chip system, or a system chip on a chip, etc.

Figure 10:
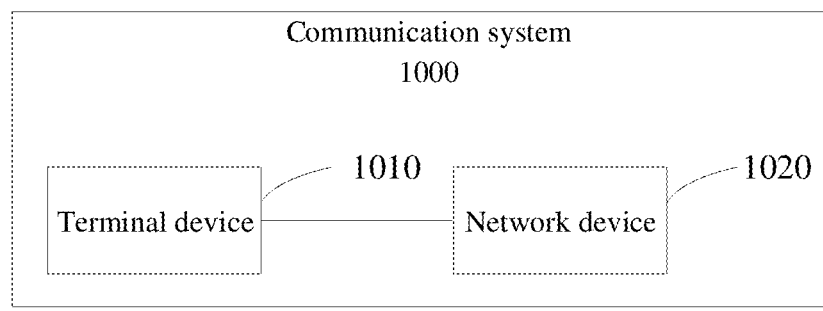
FIG. 10 is a schematic block diagram of a communication system according to an implementation of the present application.

FIG. 10 is a schematic block diagram of a communication system 1000 according to an implementation of the present application. As shown in FIG. 10, the communication system 1000 includes a terminal device 1010 and a network device 1020.

The terminal device 1010 may be used for implementing corresponding functions implemented by the terminal device in the above-mentioned methods, and the network device 1020 may be used for implementing corresponding functions implemented by the network device in the above-mentioned methods, which will not be repeated here for brevity.

It should be understood that the processor in the implementations of the present application may be an integrated circuit chip with a capability for processing a signal. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement or perform various methods, acts, and logical block diagrams disclosed in the implementations of the present application. The general purpose processor may be a microprocessor, or the processor may also be any conventional processor, or the like. The acts of the methods disclosed in the implementations of the present application may be directly embodied to be performed by a hardware decoding processor, or may be performed by a combination of hardware and software modules in a decoding processor. The software modules may be located in a storage medium which is mature in the art, such as a Random Access Memory, a flash memory, a Read Only Memory, a Programmable Read Only Memory, or an electrically erasable programmable memory, or a register. The storage medium is located in a memory, and a processor reads information in the memory and completes acts of the above methods in combination with its hardware.

It should be understood that the memory in the implementations of the present application may be a volatile memory or a non-volatile memory, or may include both volatile and non-volatile memories. The non-volatile memory may be a Read Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As an example, but not as a restriction, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described herein is intended to include, but is not limited to, these and any other suitable types of memories.

It should be understood that, the foregoing memories are described as examples rather than as limitations. For example, the memory in the implementations of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is to say, the memory in the implementations of the present application is intended to include, but is not limited to, these and any other suitable types of memories.

An implementation of the present application further provides a computer-readable storage medium configured to store a computer program.

Optionally, the computer-readable storage medium may be applied to the network device in the implementations of the present application, and the computer program enables a computer to perform corresponding processes implemented by the network device in various methods in the implementations of the present application, which will not be repeated here for brevity.

Optionally, the computer-readable storage medium may be applied to the mobile terminal/terminal device in the implementations of the present application, and the computer program enables a computer to perform corresponding processes implemented by the mobile terminal/terminal device in various methods in the implementations of the present application, which will not be repeated here for brevity.

An implementation of the present application further provides a computer program product, including computer program instructions.

Optionally, the computer program product may be applied to the network device in the implementations of the present application, and the computer program instructions enable a computer to perform corresponding processes implemented by the network device in various methods in the implementations of the present application, which will not be repeated here for brevity.

Optionally, the computer program product may be applied to the mobile terminal/terminal device in the implementations of the present application, and the computer program instructions enable a computer to perform corresponding processes implemented by the mobile terminal/terminal device in various methods in the implementations of the present application, which will not be repeated here for brevity.

An implementation of the present application further provides a computer program.

Optionally, the computer program may be applied to the network device in the implementations of the present application. When the computer program is run on a computer, the computer is enabled to perform corresponding processes implemented by the network device in various methods in the implementations of the present application, which will not be repeated here for brevity.

Optionally, the computer program may be applied to the mobile terminal/terminal device in the implementations of the present application. When the computer program is run on a computer, the computer is enabled to perform corresponding processes implemented by the mobile terminal/terminal device in various methods in the implementations of the present application, which will not be repeated here for brevity.

Those of ordinary skills in the art will recognize that units and algorithm acts of various examples described in connection with the implementations disclosed herein can be implemented in electronic hardware, or a combination of computer software and electronic hardware. Whether these functions are implemented in a form of hardware or software depends on a specific application and a design constraint of a technical solution. Those skilled in the art may use different methods to implement the described functions for each particular application, but such implementation should not be considered to be beyond the scope of the present application.

Those skilled in the art may clearly understand that for convenience and conciseness of description, as to specific working processes of the systems, apparatuses, and units described above, reference may be made to corresponding processes in the aforementioned method implementations, and details will not be repeated here.

In several implementations according to the present application, it should be understood that the disclosed systems, apparatuses, and methods may be implemented in other ways. For example, the apparatus implementations described above are only illustrative, for example, a division of the units is only a logical function division, and there may be another division manner in actual implementation. For example, multiple units or components may be combined or integrated into another system, or some features may be ignored or not executed. In addition, mutual coupling or direct coupling or communication connection shown or discussed may be indirect coupling or communication connection of apparatuses or units through some interfaces, and may be in electrical, mechanical, or other forms.

Units described as separated components may or may not be physically separated, and components shown as units may or may not be physical units, i.e., they may be located in one place or may be allocated over multiple network units. Some or all of the units may be selected according to practical needs to achieve purposes of solutions of the implementations.

In addition, various functional units in various implementations of the present application may be integrated in one processing unit, or various units may be physically present separately, or two or more units may be integrated in one unit.

The functions may be stored in a computer readable storage medium if implemented in a form of a software functional unit and sold or used as a separate product. Based on this understanding, technical solutions of the present application, in essence, or a part contributing to the existing art, or part of the technical solutions, may be embodied in a form of a software product, the computer software product is stored in a storage medium and includes several instructions for enabling a computer device (which may be a personal computer, a server, or a network device, etc.) to perform all or part of acts of the methods described in various implementations of the present application. And the aforementioned storage medium includes various media, such as a U disk, a mobile hard disk, a Read Only Memory (ROM), a Random Access Memory (RAM), a magnetic disk, or an optical disk, which may store program codes.

The foregoing are merely specific implementations of the present application, but the protection scope of the present application is not limited thereto. Any variation or substitution that may be easily conceived by any person skilled in the art within the technical scope disclosed by the present application shall be covered by the protection scope of the present application. Therefore, the protection scope of the present application should be subject to the protection scope of the claims.

What is claimed is:

1. A method for determining information, comprising:
    sending, by a terminal device, a preamble on multiple random access resources; and
    determining, by the terminal device, first resource information associated with the multiple random access resources, and determining a Random Access-Radio Network Temporary Identifier (RA-RNTI) based on the first resource information, the RA-RNTI being used for descrambling a first Physical Downlink Control Channel (PDCCH), and the first PDCCH being used for carrying control information of a random access response message corresponding to the preamble and/or the random access resources; wherein the multiple random access resources are distributed in a first frequency domain range and the first frequency domain range comprises multiple random access resource groups; wherein the first frequency domain range comprises multiple sub-bands, the multiple random access resource groups in the first frequency domain range are distributed in the multiple sub-bands, each sub-band in the multiple sub-bands comprises M random access resource groups, numbers of the M random access resource groups in each sub-band are unique in the sub-band, M being a positive integer greater than 1; the multiple random access resources belong to a first random access resource group in a first sub-band; and
    the first resource information associated with the multiple random access resources refers to index information of the first sub-band and index information of the first random access resource group.

2. The method according to claim 1, wherein the multiple random access resources are distributed in a first sub-band.

3. The method according to claim 2, wherein the first resource information associated with the multiple random access resources refers to index information of a first random access resource among the multiple random access resources.

4. The method according to claim 3, wherein the first random access resource is a random access resource with a smallest index value among the multiple random access resources.

5. The method according to claim 3, wherein the first random access resource is a random access resource with a largest index value among the multiple random access resources.

6. The method according to claim 2, wherein the first sub-band comprises multiple random access resource groups, and the multiple random access resources belong to a first random access resource group among the multiple random access resource groups; and the first resource information associated with the multiple random access resources refers to index information of the first random access resource group.

7. The method according to claim 1, wherein the multiple random access resources belong to a first random access resource group among the multiple random access resource groups; and the first resource information associated with the multiple random access resources refers to index information of the first random access resource group.

8. The method according to claim 6, wherein each random access resource group in the multiple random access resource groups comprises N random access resources, N being an integer greater than 1; wherein the N random access resources in each random access resource group are continuously distributed in a frequency domain; or the N random access resources in each random access resource group are distributed discontinuously in a frequency domain.

9. The method according to claim 8, wherein a value of N is configured through a broadcast message; or a value of N is configured through a Radio Resource Control (RRC) signaling; or a value of N is predefined.

10. The method according to claim 1, wherein the determining the RA-RNTI based on the first resource information comprises:

calculating the RA-RNTI by using the first resource information as a frequency domain identification parameter.

11. A method for determining information, comprising:

receiving, by a network device, a preamble on multiple random access resources; and determining, by the network device, first resource information associated with the multiple random access resources, and determining a Random Access-Radio Network Temporary Identifier (RA-RNTI) based on the first resource information, the RA-RNTI being used for scrambling a first Physical Downlink Control Channel (PDCCH), and the first PDCCH being used for carrying control information of a random access response message corresponding to the preamble and/or the random access resources; wherein the multiple random access resources are distributed in a first frequency domain range and the first frequency domain range comprises multiple random access resource groups; wherein the first frequency domain range comprises multiple sub-bands, the multiple random access resource groups in the first frequency domain range are distributed in the multiple sub-bands, each sub-band in the multiple sub-bands comprises M random access resource groups, numbers of the M random access resource groups in each sub-band are unique in the sub-band, M being a positive integer greater than 1; the multiple random access resources belong to a first random access resource group in a first sub-band; and the first resource information associated with the multiple random access resources refers to index information of the first sub-band and index information of the first random access resource group.

12. The method according to claim 11, wherein the multiple random access resources are distributed in a first sub-band.

13. The method according to claim 12, wherein the first resource information associated with the multiple random access resources refers to index information of a first random access resource among the multiple random access resources.

14. The method according to claim 12, wherein the first sub-band comprises multiple random access resource groups, and the multiple random access resources belong to a first random access resource group among the multiple random access resource groups; and the first resource information associated with the multiple random access resources refers to index information of the first random access resource group.

15. A terminal device, comprising: a processor, a transceiver and a memory, the memory being configured to store a computer program, and the processor or the transceiver being configured to call and run the computer program stored in the memory to perform the method according to claim 1.

16. A network device, comprising: a processor, a transceiver and a memory, the memory being configured to store a computer program, and the processor or the transceiver being configured to call and run the computer program stored in the memory to perform the method according to claim 11.

* * * * *